United States Patent
Breese

(10) Patent No.: US 7,794,848 B2
(45) Date of Patent: Sep. 14, 2010

(54) MDO MULTILAYER POLYETHYLENE FILM

(75) Inventor: D. Ryan Breese, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 479 days.

(21) Appl. No.: 11/698,591

(22) Filed: Jan. 25, 2007

(65) Prior Publication Data

US 2008/0178768 A1    Jul. 31, 2008

(51) Int. Cl.
B32B 27/08    (2006.01)

(52) U.S. Cl. ...................................... 428/515

(58) Field of Classification Search ............. None
See application file for complete search history.

(56) References Cited

U.S. PATENT DOCUMENTS

| | | | |
|---|---|---|---|
| 4,289,830 A * | 9/1981 | Knott, II | 428/475.8 |
| 4,542,199 A | 9/1985 | Kaminsky et al. | |
| 5,539,124 A | 7/1996 | Etherton et al. | |
| 5,637,660 A | 6/1997 | Nagy et al. | |
| 5,756,611 A | 5/1998 | Etherton et al. | |
| 6,034,027 A | 3/2000 | Krishnamurti et al. | |
| 6,613,841 B2 | 9/2003 | Williams | |
| 6,887,923 B2 | 5/2005 | Bowling et al. | |
| 7,011,892 B2 | 3/2006 | Breese | |
| 7,078,081 B2 | 7/2006 | Breese | |

FOREIGN PATENT DOCUMENTS

| | | |
|---|---|---|
| EP | 0 673 759 A2 | 9/1995 |
| WO | WO 2005/092595 A1 | 10/2005 |

OTHER PUBLICATIONS

E. Hatfield et al., "New MDO Medium Molecular Weight High Density Polyethylene Films" in Journal of Plastic Film & Sheeting, 2002, p. 117, vol. 18.

* cited by examiner

*Primary Examiner*—Sheeba Ahmed
(74) *Attorney, Agent, or Firm*—Shao-Hua Guo

(57) ABSTRACT

A multilayer film and a method of making the film are disclosed. In the method a multilayer film is post-oriented uniaxially in the machine direction resulting in a film that has a water vapor transmission rate of less than 2.5 g-mil/$m^2$-day and an oxygen transmission rate of less than 1.5 $cm^2$-mil/$m^2$-day. The film of this invention is ideal for applications requiring low water vapor and oxygen transmission rates.

18 Claims, No Drawings

MDO MULTILAYER POLYETHYLENE FILM

FIELD OF THE INVENTION

The present invention relates to multilayer films that possess good water vapor and oxygen barrier properties.

BACKGROUND OF THE INVENTION

Polyethylenes are used to prepare food packaging films, grocery bags, stretch-wraps, shrink-wraps, garbage can liners and shipping bags. Some applications, such as wrapping prepared or raw foodstuffs, require films that provide a sufficiently low water vapor and oxygen transmission rate to preserve the contents.

Packaging films with low water vapor transmission rates (WVTR) and low oxygen transmission rates (OTR) are generally produced by laminating foil, metalized films (e.g., Al on PET or PE), or through the use of metal oxides (e.g. silicon dioxide ($SiO_x$), titanium oxide ($TiO_x$) or aluminum oxide ($Al_2O_3$)), which can be deposited by chemical vapor deposition. The addition of metalized films or metal oxides increases the cost and complexity of producing these films. Laminated polyvinylidene chloride (PVdC) films are also commonly used because of their excellent barrier properties and low water vapor and oxygen transmission rates. Although the above mentioned laminated films have low water vapor and oxygen transmission rates these films tend to be more expensive to produce than polyolefin films.

Polyethylene films have also been disclosed. For example, U.S. Pat. No. 6,613,841 discloses the preparation of a machine direction oriented (MDO) polyethylene film that is a blend of a high-molecular weight, medium-density polyethylene (HMW-MDPE) and linear low-density polyethylene (LLDPE). U.S. Pat. Nos. 7,011,892 and 7,078,081 disclose the uniaxial orientation in the machine direction of a high-density polyethylene film (HDPE) that is produced by a high-stalk blown extrusion process. While polyethylene films can provide a sufficient barrier to water vapor due to their hydrophobic nature they generally need to be combined with additional layers or materials to improve their oxygen barrier properties.

A polyethylene film that has the low water vapor and oxygen transmission rates comparable to a PVdC or a laminated polymer film (e.g. metal foils, metal oxides) without the additional complexity or cost would be commercially useful.

SUMMARY OF THE INVENTION

The present invention is a multilayer film and a method of preparing the multilayer film. The multilayer film comprises an ethylene-vinyl alcohol copolymer (EVOH) layer having a first surface and a second surface, a first tie-layer adhesive bonded to the first surface and a second tie-layer adhesive bonded to the second surface of the EVOH layer, and at least one high density polyethylene (HDPE) layer bonded to the first tie-layer and at least one polyethylene layer selected from the group consisting of linear low density polyethylene (LLDPE) and high density polyethylene (HDPE) bonded to the second tie-layer. The multilayer film is post-oriented uniaxially in the machine-direction with a "drawdown ratio" (film thickness before orientation/film thickness after orientation) of about 5 or greater with a final film thickness of about 0.75 to about 1.5 mil.

Surprisingly we found that the multilayer film of the invention has a water vapor and oxygen transmission rates which are comparable to those of PVdC films. More specifically, the water vapor and oxygen transmission rates of the multilayer film of the invention are less than 3.5 g-mil/$m^2$-day and less than 2.5 $cm^2$-mil/$m^2$-day, respectively. Preferably the multilayer film has water vapor transmission rate (WVTR) of less than 3 g-mil/$m^2$-day and an oxygen transmission rate (OTR) of less than 2 $cm^2$-mil/$m^2$-day with a drawdown ratio greater than about 6 and most preferably a WVTR of less than 2.5 g-mil/$m^2$-day and an OTR of less than 1.5 $cm^2$-mil/$m^2$-day with a drawndown ratio of greater than about 7.

DETAILED DESCRIPTION OF THE INVENTION

The invention is a multilayer film that possesses low water vapor and oxygen transmission rates. The multilayer film contains at least five layers comprising the following materials: linear low density polyethylene (LLDPE), high density polyethylene (HDPE), ethylene-vinyl alcohol (EVOH) or derivatives thereof. The tie-adhesive layer can be prepared with a variety of materials depending on the layers being bonded. One embodiment of the invention is a seven-layer film: LLDPE/HDPE/tie-layer/EVOH/tie-layer/HDPE/LLDPE. The invention is also a method of post orienting the multilayer film uniaxially in the machine direction with a drawdown ratio of greater than 5 to produce a film with reduced permeability to oxygen and water vapor. By "drawdown ratio" I mean the film thickness before orientation/film thickness after orientation. For example, when a 4-mil film is oriented in the machine direction to a 1-mil film, the drawdown ratio is 4.

Suitable linear low density polyethylenes (LLDPE) include copolymers of ethylene and α-olefins (about 5 to about 15 wt. %). Alpha-olefins include 1-butene, 1-hexene, and 1-octene, the like, and mixtures thereof. The density of LLDPE is within the range of about 0.865 to about 0.925 g/$cm^3$. LLDPE is commercially available, for instance GS707® LLDPE from Lyondell Chemical Company.

Suitable high density polyethylenes (HDPE) include ethylene homopolymer and copolymers of ethylene and α-olefins (about 0.1 to about 10 wt. %). Suitable alpha-olefins include 1-butene, 1-hexene, and 1-octene, the like, and mixtures thereof. The density of HDPE is preferably from about 0.940 to about 0.970 g/$cm^3$. HDPE is commercially available, for instance XL3805® and L5906® HDPE from Lyondell Chemical Company.

Suitable tie-resins are selected based on the layers being bonded, the melt index, process conditions, secondary operations (e.g. orientation) and the cost. The melt index should be selected so that the layers in contact have similar viscosities; otherwise the flow instabilities can lead to waviness or poor layer distribution. Generally the interior layer should have the highest viscosity, while the skin or outer layer should have the lowest viscosity. A suitable tie-layer adhesive for the seven-layer film is maleic anhydride grafted polyolefins or derivatives thereof.

Ethylene-vinyl alcohol copolymer (EVOH) and its derivatives are employed as a barrier to oxygen. It should be understood by those with skill in the art that more than one layer of EVOH may be employed to further lower the oxygen transmission rate of the multilayer film.

Suitable LLDPE and HDPE can be produced by a Ziegler, single-site, or any other olefin polymerization catalyst. Ziegler catalysts and co-catalysts are well known in the art. Metallocene single-site catalysts are transition metal compounds that contain cyclopentadienyl (Cp) or Cp derivative ligands. For example, U.S. Pat. No. 4,542,199, the teachings of which are incorporated herein by reference, teaches the preparation of metallocene catalysts. Non-metallocene single-site catalysts contain heteroatomic ligands, e.g., boraaryl, pyrrolyl, azaborolinyl or quinolinyl. For example, U.S. Pat. Nos. 6,034,027, 5,539,124, 5,756,611, and 5,637,660, the teachings of which are incorporated herein by reference, disclose non-metallocene catalysts.

The HDPE can also be multimodal. By "multimodal" I mean that the polymer comprises at least two components, one of which has a relatively low molecular weight, the other a relatively high molecular weight. The multimodal polyethylene can be produced by polymerization using conditions that create a multimodal polymer product. This can be accomplished by using a catalyst system with two or more different catalytic sites or by using two or multi-stage polymerization processes with different process conditions in the different stages (e.g. different temperatures, pressures, polymerization media, hydrogen partial pressures, etc). Multimodal HDPE may be produced by a multistage ethylene polymerization, using a series of reactors, with comonomer addition in only one of the reactors.

One preferred embodiment of the invention is a seven-layer film comprising the following arrangement of layers: LLDPE/HDPE/tie-layer/EVOH/tie-layer/HDPE/LLDPE. The water vapor and oxygen transmission rates of the seven-layer films are evaluated with varying drawdown ratios. The water vapor and oxygen transmission rates for the seven-layer film are less than about 3.5 g-mil/m$^2$-day and less than about 2.5 cm$^2$-mil/m$^2$-day, respectively. Preferably the multilayer film has water vapor transmission rate of less than about 3 g-mil/m$^2$-day and an oxygen transmission rate of less than about 2 cm$^2$-mil/m$^2$-day and a drawdown ratio greater than or equal to 6, and most preferably a water vapor transmission rate of less than 2.5 g-mil/m$^2$-day and an oxygen transmission rate of less than about 1.5 cm$^2$-mil/m$^2$-day with a drawdown ratio of equal to or greater than 7.

The multilayer film of the invention can be made by a variety of processes before the machine-direction orientation (MDO) of the film. The multilayer film can be made by co-extrusion, coating, and other laminating processes. The film can be made by casting or blown film processes. Blown film processes include high-stalk and in-pocket processes. In a high-stalk process, the extrudate exits the annular opening in the die in the form of a tubular "stalk" that is inflated a distance (usually the length of the stalk) from the extrusion die. For an in-pocket blown process, the tube is inflated as the tube exits the extrusion die. After the tube is flattened and cooled it can be slit to form a film.

The multilayer film is then uniaxially oriented in the machine or processing direction. During the MDO, the film from the blown-film line or other film process is heated to an orientation temperature. Preferably, the orientation temperature is about 5 to 7° C. below the melting temperature of the outer layer. The heating is preferably performed utilizing multiple heated rollers. The heated film is fed into a slow drawing roll with a nip roller, which has the same rolling speed as the heated rollers. The film then enters a fast drawing roll. The fast drawing roll has a speed that is 2 to 10 times faster than the slow draw roll, which effectively orients the film on a continuous basis. The oriented film is annealed by holding the film at an elevated temperature for a period of time to allow for stress relaxation. The temperature of the annealing thermal rollers is preferably from about 100 to about 125° C. and the annealing time is from about 1 to about 2 seconds. Finally, the film is cooled by contacting the film with rollers that are at ambient temperature.

The seven-layer film's "initial" thickness (before MDO) is ranged from about 1 to about 8 mil. The thickness of each individual layer, as a percentage of the total film thickness (seven-layers) is about 15% LLDPE/20% HDPE/5% tie-layer/20% EVOH/5% tie-layer/20% HDPE/15% LLDPE. The drawdown ratios is ranged from about 1 to 8, resulting in a "final" thickness (after machine direction orientation) of about 1 mil. Films that are oriented with a drawdown ratio between about 2 to about 5 are found to exhibit draw resonance. By "draw resonance" I mean uneven drawing in the machine direction. Surprisingly I found that drawdown ratios greater than about 6 produces films with water vapor and oxygen transmission rates that are comparable to the PVdC film.

It should be understood by those with skill in the art that the seven-layer film is only one of many possible embodiments of this invention that employs LLDPE, HDPE, EVOH and tie-layers. The number of layers and their thickness can be adjusted depending on the function or end-use of the film. Another embodiment is a five-layer film such as HDPE/Tie-Adhesive/EVOH/Tie-Adhesive/HDPE or a nine-layer film such as LLDPE/HDPE/tie-layer/EVOH/tie-layer/EVOH/tie-layer/HDPE/LLDPE.

The multilayer thin film of the invention has many uses including grocery bags, stretch-wraps and food packaging films where low water vapor and oxygen permeation rates are required.

The following examples merely illustrate the invention. Those skilled in the art will recognize many variations that are within the spirit of the invention and scope of the claims.

EXAMPLES

Machine Direction Orientation of a HDPE/LLDPE/Tie-Layer/EVOH/Tie-Layer/LLDPE/ HDPE Seven-Layer Coextruded Film A high density polyethylene (HDPE, Alathon® M6210, product of Equistar, a Lyondell Company, density: 0.958 g/cm$^3$), a linear low density polyethylene (LLDPE, EXCEED® 1318CA, density 0.918 g/cm$^3$, product of ExxonMobil Chemical), a tie layer resin (Plexar®, PX3080, maleic anhydride-grafted polyethylene, product of Equistar, a Lyondell Company), and EVOH (Soarnol® ET3803, 38% ethylene in mole, product of Nippon Gohsei) are coextruded and converted to a seven-layer film (LLDPE/HDPE/tie-layer/EVOH/tie-layer/HDPE/LLDPE).

The films of Examples 1 through 8 have starting thickness of 1, 1, 4, 5, 6, 7, 8 and 8, respectively. The films are machine-direction oriented to a final thickness of about 1 mil with a corresponding drawdown ratio (see Table 1). The machine direction orientation is performed on a Dr. Collin line at Equistar Chemicals. The unit consists of preheating, drawing, annealing, and cooling sections, with each set at specific temperatures to optimize the performance of the unit and produce films with the desired properties. The preheating, drawing, and annealing sections are operated at temperatures approximately 5° C. to 7° C. below the melting temperature of the outer layer film. The cooling section is operated at ambient conditions. The OTR and WVTR properties, which are measured according to ASTM D3985 and ASTM F1249, respectively, are listed in Table 1. The OTR and WVTR values are normalized for thickness.

TABLE 1

BARRIER PROPERTIES OF HDPE/LLDPE/TIE-LAYER/EVOH/TIE-LAYER/LLDPE/HDPE SEVEN-LAYER COEXTRUDED FILMS

| Examples | Draw Down Ratio* | Initial Thickness (MIL) | Final Thickness (MIL) | WVTR (g-mil/m$^2$-day) | OTR (cm$^2$-mil/m$^2$-day) |
|---|---|---|---|---|---|
| 1 | 1.02 | 1.0 | 0.98 | 7.02 | 4.48 |
| 2 | 1.06 | 1.0 | 0.94 | 7.24 | 5.27 |
| 3 | 5.88 | 4.0 | 0.85 | 3.29 | 2.27 |
| 4 | 5.88 | 5.0 | 1.02 | 3.48 | 2.19 |

TABLE 1-continued

BARRIER PROPERTIES OF HDPE/LLDPE/TIE-LAYER/EVOH/TIE-LAYER/LLDPE/HDPE SEVEN-LAYER COEXTRUDED FILMS

| Examples | Draw Down Ratio* | Initial Thickness (MIL) | Final Thickness (MIL) | WVTR (g-mil/m$^2$-day) | OTR (cm$^2$-mil/m$^2$-day) |
|---|---|---|---|---|---|
| 5 | 6.40 | 6.0 | 1.25 | 2.50 | 1.84 |
| 6 | 6.56 | 7.0 | 0.61 | 3.15 | 1.56 |
| 7 | 7.37 | 8.0 | 0.95 | 2.71 | 1.84 |
| 8 | 7.62 | 8.0 | 1.05 | 1.96 | 1.33 |

*There are no results for films with a drawdown ratio of 2-5, due to draw resonance.

I claim:

1. A multilayer film comprising:
   (a) an ethylene-vinyl alcohol copolymer (EVOH) layer having a first surface and a second surface,
   (b) a first tie-layer adhesive bonded to the first surface and a second tie-layer adhesive bonded to the second surface of the EVOH layer,
   (c) at least one high density polyethylene (HDPE) layer bonded to the first tie-layer and at least one polyethylene layer selected from the group consisting of linear low density polyethylene (LLDPE) and high density polyethylene (HDPE) bonded to the second tie-layer,
   wherein the multilayer film is post-oriented uniaxially in the machine-direction with a draw down ratio of greater than about 5 and wherein the post-oriented film has a water vapor transmission rate less than about 3.5 g-mil/m$^2$-day and an oxygen transmission rate of less than about 2.5 cm$^2$-mil/m$^2$-day.

2. The multilayer film of claim 1 wherein the HDPE is prepared with a Ziegler catalyst.

3. The multilayer film of claim 1 wherein the HDPE is prepared with a single-site catalyst.

4. The multilayer film of claim 1 wherein the HDPE is multimodal.

5. The multilayer film of claim 1 wherein the drawdown ratio is greater than about 6.

6. The multilayer film of claim 1 wherein the water vapor transmission rate is less than about 3.0 g-mil/m$^2$-day and the oxygen transmission rate is less than about 2.0 cm$^2$-mil/m$^2$-day.

7. The multilayer film of claim 1 wherein the water vapor transmission rate is less than about 2.5 g-mil/m$^2$-day and an oxygen transmission rate of less than about 1.5 cm$^2$-mil/m$^2$-day.

8. The multilayer film of claim 1 wherein the first and second tie layers are a maleic anhydride grafted polyolefin.

9. The multilayer film of claim 1 wherein the post-oriented film has a thickness within the range of about 0.75 to about 1.5 mil.

10. The multilayer film of claim 1 wherein the film is seven-layers comprising the following layers, in order, as follows: LLDPE/HDPE/tie-layer/EVOH/tie-layer/HDPE/LLDPE.

11. The multilayer film of claim 10 wherein the thickness of each individual layer as a percentage of total film thickness before the machine direction orientation is about 15% LLDPE/20% HDPE/5% tie-layer/20% EVOH/5% tie-layer/20% HDPE/15% LLDPE.

12. The multilayer film of claim 10 wherein the HDPE layers have a density, the same or different, within the range of about 0.945 to about 0.970 g/cm$^3$ and the LLDPE layers have a density, the same or different, of about 0.865 to about 0.925 g/cm$^3$.

13. A method of modifying a multilayer film comprising post-orienting the film uniaxially in the machine-direction with a drawdown ratio greater than about 5, wherein the resulted post-oriented film has a water vapor transmission rate of less than about 3.5 g-mil/m$^2$-day and an oxygen transmission rate of less than about 2.5 cm$^2$-mil/m$^2$-day.

14. The method of claim 13 wherein the multilayer film is seven layers comprising the following layers, in order, as follows: LLDPE/HDPE/tie-layer/EVOH/tie-layer/HDPE/LLDPE.

15. The method of claim 14 wherein the water vapor transmission rate is less than about 3.0 g-mil/m$^2$-day and the oxygen transmission rate is less than about 2.0 cm$^2$-mil/m$^2$-day.

16. The method of claim 14 wherein the water vapor transmission rate is less than about 2.5 g-mil/m$^2$-day and the oxygen transmission rate is less than about 1.5 cm$^2$-mil/m$^2$-day.

17. The method of claim 14 wherein the drawdown ratio is greater than about 6.

18. The method of claim 14 wherein the drawdown ratio is greater than about 7.

* * * * *